(No Model.)
S. GROSSMAN.
FRUIT PRESS.
No. 475,856. Patented May 31, 1892.
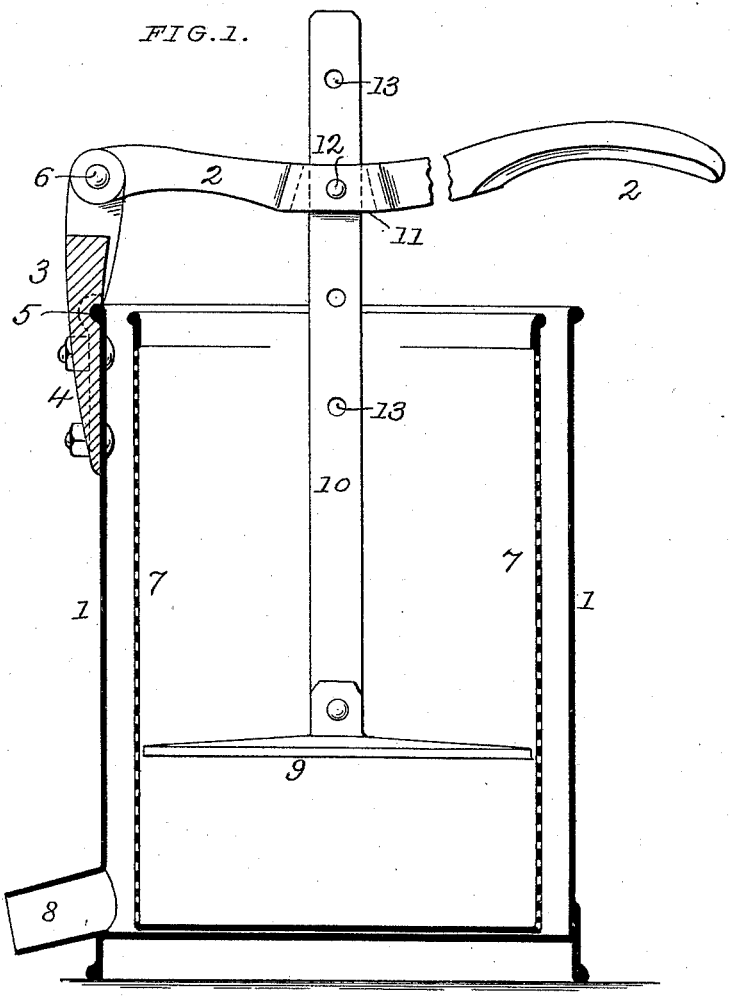
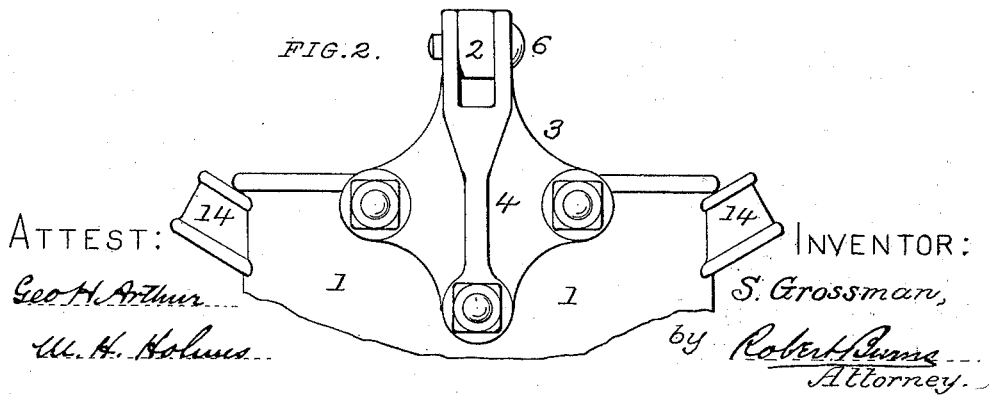
ATTEST:
Geo. H. Arthur
M. H. Holmes
INVENTOR:
S. Grossman,
by Robert Burns
Attorney.

UNITED STATES PATENT OFFICE.

SAMUEL GROSSMAN, OF CHICAGO, ILLINOIS.

FRUIT-PRESS.

SPECIFICATION forming part of Letters Patent No. 475,856, dated May 31, 1892.

Application filed February 24, 1891. Serial No. 382,648. (No model.)

*To all whom it may concern:*

Be it known that I, SAMUEL GROSSMAN, a citizen of the United States, residing at Chicago, in the county of Cook and State of Illinois, have invented certain new and useful Improvements in Household Fruit-Presses; and I do hereby declare the following to be a full, clear, and exact description of the same, reference being had to the accompanying drawings, forming a part of this specification.

This invention relates to fruit-presses for household and like uses, and in which the material is placed within a perforated cylindrical strainer and exposed to pressure therein by a movable platen operated by a hand-lever, the object of the present improvement being to provide a simple, cheap, and durable arrangement of press parts embodying the features of a simple and effective means for collecting the juices, &c., as they are expressed from the strainer, a simple and effective fulcrum attachment for the hand-lever, and a means for changing the position of the platen with relation to the hand-lever, so as to adjust the press parts to suit differences or variations in quantity of the article to be pressed or strained. I attain such object by the construction and arrangement of parts illustrated in the accompanying drawings, in which—

Figure 1 is a vertical section of my improved fruit press or strainer, and Fig. 2 a detail side elevation of the upper portion of the same in a plane at right angles to Fig. 1.

Similar numerals of reference indicate like parts in both views.

Referring to the drawings, 1 represents the outer imperforate casing or vessel, which in the present invention is made of heavy sheet metal, so as to be strong and rigid for the purpose of affording a fulcrum attachment for the hand-lever 2, the fulcrum-bracket 3 of which has its base portion 4 formed with a dependent and a pair of lateral ears, through which pass the bolts or rivets by which the fulcrum-bracket is firmly and strongly attached to the upper margin or rim of the outer cylindrical casing 1, the attachment being additionally strengthened by means of a beaded groove 5 in the inner face of the fulcrum-bracket, fitting upon the beaded margin of the casing 1, as illustrated in Fig. 1.

6 is the fulcrum-pin passing through the forked upper part of the bracket and through the pivot end of the hand-lever 2, as shown.

7 is the inner removable perforate vessel, of a cylindrical shape and of a less diameter than the outer casing, so as to leave an annular surrounding chamber for receiving the juice expressed from the fruit, which as fast as expressed passes away through the spout 8 at the lower end of the outer casing.

9 is the pressure-platen having an upwardly-projecting shank or bar 10, attached in a limited pivoted manner and adapted to pass through an eye 11 in the hand-lever 2, with which it is engaged in a vertically-adjustable manner by means of a pin 12, passing through the hand-lever and through one of the vertical series of holes 13 in said bar 10, as represented in Fig. 1.

14 are handles on the outer casing for convenience in handling the press.

Having thus fully described my said invention, what I claim as new, and desire to secure by Letters Patent, is—

A household fruit-press comprising, in combination, an outer imperforate sheet-metal vessel or casing 1, having an open top, a closed bottom, and an outlet-spout 8, a fulcrum-bracket 3, having pendent and lateral attaching ears by which it is attached to the top rim of the casing 1, a hand-lever 2, having its fulcrum in the bracket 3, connecting-bar 10, platen 9, and removable inner perforate casing 7, as described, and for the purpose set forth.

In testimony whereof witness my hand this 21st day of February, 1891.

SAMUEL GROSSMAN.

In presence of—
ROBERT BURNS,
GEO. H. ARTHUR.